United States Patent
Marold et al.

(10) Patent No.: US 7,339,611 B2
(45) Date of Patent: *Mar. 4, 2008

(54) METHOD AND ARRANGEMENT FOR CARRYING OUT AN INFORMATION FLOW AND DATA FLOW FOR GEODETIC INSTRUMENTS

(75) Inventors: Thomas Marold, Jena (DE); Marcel Seeber, Cologne (DE); Eyk Taege, Erfurt (DE); Christian Usbeck, Benshausen (DE)

(73) Assignee: Trimble Jena GmbH, Jena (DE)

( * ) Notice: Subject to any disclaimer, the term of this patent is extended or adjusted under 35 U.S.C. 154(b) by 1196 days.

This patent is subject to a terminal disclaimer.

(21) Appl. No.: 09/861,130

(22) Filed: May 18, 2001

(65) Prior Publication Data

US 2002/0018122 A1    Feb. 14, 2002

(30) Foreign Application Priority Data

May 20, 2000   (DE) .............................. 100 25 110

(51) Int. Cl.
 *H04N 5/225*  (2006.01)
(52) U.S. Cl. .............................. 348/207.99; 348/222.1
(58) Field of Classification Search ........... 348/207.99, 348/222.1, 116, 135; 358/5.01, 141.1, 141.3, 358/148; 701/207; 702/104; 33/292, 290
See application file for complete search history.

(56) References Cited

U.S. PATENT DOCUMENTS

| | | | | |
|---|---|---|---|---|
| 4,682,218 A | * | 7/1987 | Kaneko ...................... | 348/116 |
| 5,216,480 A | | 6/1993 | Kaneko et al. | |
| 5,657,003 A | | 8/1997 | Fuentes | |
| 6,023,326 A | * | 2/2000 | Katayama et al. ....... | 356/141.3 |
| 6,031,606 A | * | 2/2000 | Bayer et al. ............. | 356/141.1 |
| 6,034,722 A | * | 3/2000 | Viney et al. ................. | 348/135 |
| 6,046,800 A | * | 4/2000 | Ohtomo et al. .......... | 356/141.1 |
| 6,396,961 B1 | * | 5/2002 | Wixson et al. .............. | 382/294 |
| 6,445,446 B1 | * | 9/2002 | Kumagai et al. ........ | 356/141.1 |
| 6,473,166 B1 | * | 10/2002 | Ohishi et al. ............ | 356/141.1 |
| 6,512,993 B2 | * | 1/2003 | Kacyra et al. .............. | 702/159 |
| 6,731,329 B1 | * | 5/2004 | Feist et al. .................. | 348/135 |

FOREIGN PATENT DOCUMENTS

DE      31 24 945      1/1983

(Continued)

OTHER PUBLICATIONS

User manual, WILD T1000-TC1000, Leica, Leica Heerbrugg AG, Switzerland.

(Continued)

Primary Examiner—Tuan Ho
(74) Attorney, Agent, or Firm—Reed Smith LLP

(57) ABSTRACT

A method and an arrangement for carrying out an information flow and data flow in a geodetic instrument with image processing is disclosed. For this purpose, the data flow and information flow needed for image processing are distributed to a plurality of function modules which are arranged in the instrument and which comprise function groups and are carried out by means of these function groups. The arrangement includes a plurality of function groups which are arranged in the instrument at locations determined by its construction design. These function groups are composed of a plurality of function modules.

7 Claims, 3 Drawing Sheets

FOREIGN PATENT DOCUMENTS

| | | |
|---|---|---|
| DE | 90 07 731.8 | 12/1994 |
| DE | 195 28 465 | 2/1997 |
| DE | 197 09 933 | 10/1997 |
| EP | 0 854 438 | 7/1998 |
| JP | 11030521 A * | 2/1999 |
| JP | 11337336 A * | 12/1999 |
| WO | WO 92/15839 | 9/1992 |
| WO | WO 97/40342 | 10/1997 |
| WO | WO 99/60335 | 11/1999 |

OTHER PUBLICATIONS

Wild ATMS (Automatisches Theodolit-Messystem zur beruehrungslosen Messung), Leica, Wild Leitz AG, Switzerland. Firmenprospekt Leica TDM5000 1996 (2 pages).

* cited by examiner

METHOD AND ARRANGEMENT FOR CARRYING OUT AN INFORMATION FLOW AND DATA FLOW FOR GEODETIC INSTRUMENTS

BACKGROUND OF THE INVENTION a) Field of the Invention

The invention is directed to a method and an arrangement for carrying out a flow of information and data for geodetic instruments, particularly for video surveying instruments such as digital video tachymeters.

b) Description of the Related Art

It is known to outfit a theodolite or a tachymeter with an image sensor. DE 31 24 945 describes a recording theodolite with a video camera and image recording. For this purpose, the video camera is mounted on the theodolite and is operated together with the associated electronics, including the monitor and video recorder.

DE 195 28 465 describes a method and an arrangement for signal evaluation which is, however, specialized only for detecting the position of a target mark by centroid formation of its electric signals. An image display is not provided.

The subject matter of DE-GM 90 07 731 relates to an angle measuring and distance measuring instrument with two attached video cameras for coarse sighting and fine sighting manually by remote control. The image is displayed on a monitor of an operator device connected with the measuring device via a cable, wherein the measuring device is remote-controlled by the operator device.

U.S. Pat. No. 4,682,218 describes a video surveying instrument in which the image can be observed independent from the telescope position in that it is displayed on a display arranged on the support. Electronics are provided for controlling the display. Image processing is not provided in this device.

U.S. Pat. No. 5,657,003 describes a video monitoring system for buildings. A laser beam projector projects a light spot on the building to be monitored. A video camera which is set up eccentric thereto monitors the position of the light spot. The image processing is carried out externally in a computer. It is disadvantageous that a plurality of devices must be set up, arranged relative to one another and connected via cables so that the entire device can operate or to arrange the information flow and data flow in such a way that remote control is possible with the same function features.

Therefore, it is the primary object of the invention to overcome the disadvantages of the prior art and to arrange the information flow and data flow in a geodetic instrument with integrated electronics such that the data resulting during measurements can be distributed, processed and displayed within the instrument and remote control with the same function features is enabled.

According to the invention, this object is met in a method for carrying out an information flow and/or data flow in a geodetic instrument with image processing comprising the steps of distributing the data flow and information flow needed for image processing to a plurality of function modules which are arranged in the instrument and which comprise function groups and are carried out by these function groups and implementing at least two different operating modes in the instrument, a first operating mode being used for orientation of the instrument to a target and a second operating mode being used for measurements in the received image.

Accordingly, it is advantageous when at least two different operating modes are carried out in the instrument for receiving and processing data in the method, wherein a first operating mode is used for orientation of the instrument to a target and a second operating mode is used for measurements in the received image. In the first mode, the observer can visually sight the target by means of a live image display. In the second operating mode, for example, the amount of deviation of a target mark from the calibrated line of collimation or target axis of the video tachymeter can be determined.

Further, in accordance with a further development of the method, it is advantageous when the image data are transmitted synchronously by the camera module and the application module to the display control module, and additional information is blended or faded into the displayed image in the display control module.

The device for carrying out an information flow and/or data flow for geodetic instruments with image processing comprises a plurality of function groups which are arranged in the geodetic instrument at locations determined by its construction design. These function groups are composed of a plurality of function modules which are realized in the instrument, at least in part, as hardware in the form of correspondingly constructed subassemblies. The function modules can also be implemented, at least in part, in software for the instrument, wherein the function modules implemented in software are associated with at least one corresponding hardware device. Accordingly, for example, the image processing module and control module can be implemented as software in a shared computer.

An advantageous construction consists in that a first function group comprises a camera module, an image pre-processing module and a data transmitting device as function modules. It is also advantageous for purposes of a compact construction of the device when the first function group is arranged in the telescope body of the geodetic instrument.

For purposes of an advantageous division of function groups, a second function group advantageously comprises a data reception device DE, a control module STM, an image processing module BVM and an image storage BSE as function modules.

Finally, it is also advantageous when a third function group comprises a display control module AAM, an image display module BAM, an application module APM and a data input device DEG as function modules.

The invention will be described more fully in the following with reference to an embodiment example.

DESCRIPTION OF THE PREFERRED EMBODIMENTS

Figure 1:
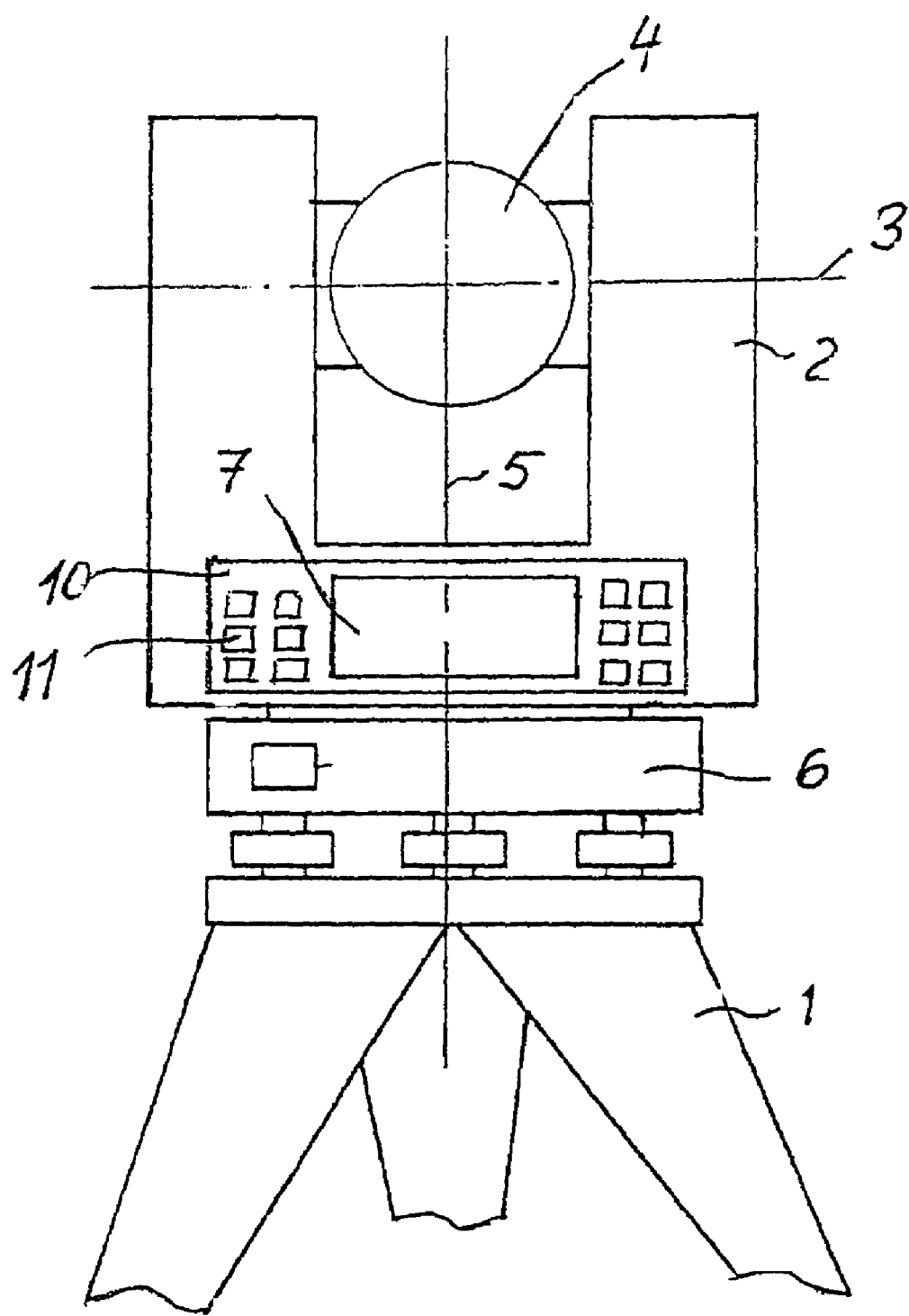
FIG. 1 shows a highly simplified geodetic instrument.

FIG. 1 shows a geodetic instrument, e.g., a video theodolite or video tachymeter, on a tripod 1 comprising a telescope body 4 which is mounted in the support 2 so as to be swivelable about a horizontal tilting axis 3. The entire geodetic instrument is mounted on a base body 6 so as to be rotatable about a vertical standing axis 5. A display unit 7 is advantageously provided in the lower part of the instrument.

Figure 2:
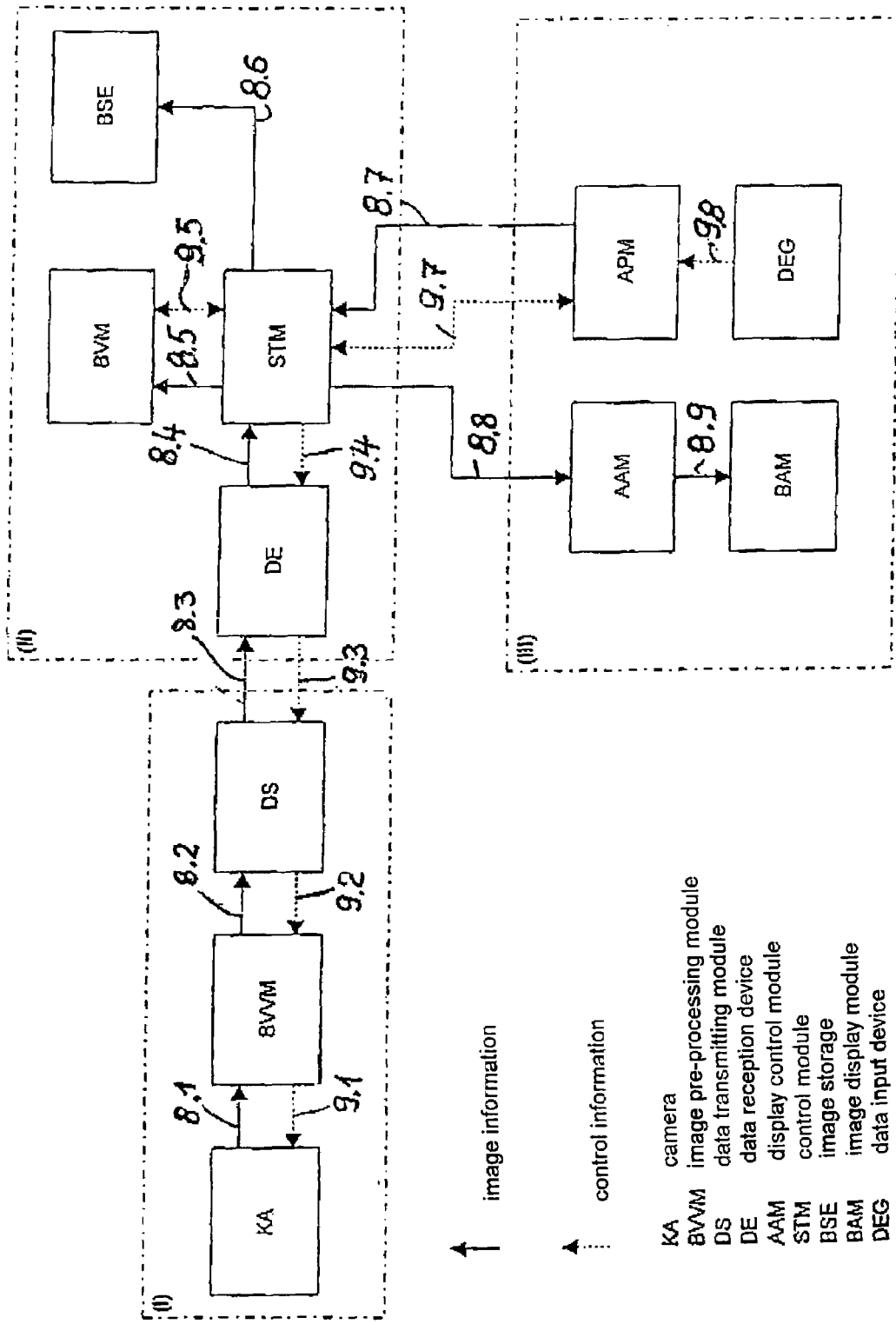
FIG. 2 shows a construction of the invention.

FIG. 2 shows a function group (I) comprising the camera module or camera KA, image pre-processing module BVVM and data transmitting device DS as function modules. These function modules are connected with one another via data lines 8 (shown as a solid line in FIGS. 2 and 3) and control lines 9 (shown as dashed lines in FIGS. 2 and 3) which can also be arranged in the form of a bidirectional bus. The data lines 8 transmit the image information and the control lines 9 transmit commands to the function modules. For purposes of a compact construction, these function modules are advisably arranged in the telescope body 4 of the geodetic instrument shown in FIG. 1.

The camera KA function module comprises all elements for electro-optic recording of an object space projected into the image space by an optical imaging system (not shown) which is arranged in the telescope body 4. Besides the electro-optic receiver, e.g., a CCD matrix in the image plane of the optical system, these elements include all opto-mechanical and electrical devices for focused imaging of the image or image sections, i.e., essentially an optical imaging system with a focusing and zoom device. Since the optic-mechanical devices are known per se, they are not shown in more detail in the drawings.

The image pre-processing BVVM function module which is connected to the camera module KA via a data line 8.1 carries out the control of the camera module KA via a control line 9.1 and the adjustment of an electronic zoom, i.e., the selection of a determined image section for further data processing. Further, this function module BVVM ensures a pre-processing of image data in such a way that the data are compressed for reducing the data flow. The algorithm which is applied for this purpose ensures that the information which is relevant for subsequent image processing is not lost. A compression of data is accordingly achieved without losses for image evaluation.

If necessary, however, compression can also be carried out with losses for the image display on the image display module BAM described in the following while retaining relevant image information.

A data transmitting device DS which is connected with the BVVM by a control line 9.2 and by a data line 8.2 and which follows the BVVM transmits the image data information via the data line 8.3 to the data reception device DE of function group (II) via a suitable bus system and accordingly carries out the electronic coupling and connection between arrangements located in the telescope body 4 and in the support 2 of the geodetic instrument. The DS and the DE are likewise connected with one another via corresponding control lines 9.3.

Function group (II) which is advantageously arranged in the support 2 of the instrument, e.g., a video tachymeter, includes, among others, the data reception device DE, control module STM, image processing module BVM and an image storage BSE as function modules. These function modules are connected with one another in a corresponding manner via data lines 8.4; 8.5; 8.6 and control lines 9.3; 9.5; 9.6 as can be seen in FIG. 2. The data reception device DE carries out the electronic coupling and connection between the telescope body 4 and the support 2 proceeding from the support 2 side. The control module STM is connected with all other function modules in function group (II) via data lines 8.4; 8.5 and 8.6 and control lines 9.4; 9.5 and 9.6 and also with the function modules associated with function group III via data lines 8.7 and 8.8 and control line 9.7.

The third function group (III) comprises the display control module AAM, image display module BAM, application module APM and data input device DEG as function modules which are connected with one another in turn, as is shown in FIG. 2, via data lines and control lines. Accordingly, the display control module AAM is connected with the control module STM on the one hand by data line 8.8 and with an image display module BAM on the other hand via data lines 8.9. The application module APM is connected with the STM by data line 8.7 and a control line 9.7 and with the data input device DEG by a control line 9.8. The data lines and control lines 8.7; 8.8 and 9.7 carry out the connection between function groups (II) and (III).

Function group (III) is advantageously arranged at the instrument in the form of a control panel 10. In principle, it can also be arranged separate from the instrument and connected with the other function groups (I) and (II) by cables or a wireless connection, not shown.

The device operates as described in the following, wherein at least two different operating modes are carried out In a first operating mode, the video signal is transmitted via the corresponding data lines from the camera KA through data lines 8.1; 8.2; 8.3; 8.4; 8.8 and 8.9 via the image pre-processing module BVVM, data transmitting device DS, data reception device DE, control module STM and display control module AAM directly to the image display module BAM in real time, wherein compression with losses can be selected by the STM in the BVVM. This mode is used for orientation of the instrument, i.e., the observer can sight the target visually by means of a live image display.

The second operating mode carries out a measurement in the image, i.e., the recording and the processing of the image data, in such a way that the obtained image data are used in the image processing module BVM to determine the position of a target point and/or different target marks, including reflectors, in relation to a calibrated target axis and to link them to a measured angle value by computer. For this purpose, a loss-free compression of data is predetermined proceeding from the control module STM for the image pre-processing module BVVM and the image data, preferably of an individual image or of a plurality of individual images, are sent from the STM to the BVM. In the BVM, for example, suitable geometric objects (points, edges, surfaces) are extracted from the image and their coordinates in the image are determined and interpolated by image processing algorithms, known per se. The deviation of a target mark from a calibrated target axis of the instrument, for example, a video tachymeter or theodolite, can be determined in this way.

Computational values of the image processing module BVM and marking of extracted geometric objects are fed back to the control module STM via the control line 9.5 for purposes of computing with other measured values, for example, angle values and distance values, which are determined in a known manner for tachymeters. For displaying in the image display module BAM, measured and calculated data, e.g., cross-lines and/or scales, can be added in the STM to the image data from the camera KA and shown and displayed together in an overlay of the image or in separate areas in the BAM.

Further, the image data obtained in function group I can be sent to an image storage BSE by the control module STM for storing so as to enable complete documentation of the entire measuring process.

Function group (III) which can be accommodated, e.g.,. in a control panel 10, expands the system by a possible interface, since the function modules AAM; BAM; APM arranged herein and the data input unit DEG can be realized inside as well as outside the video tachymeter. Accordingly, the display of image data, the control of the geodetic instrument and the execution of geodetic applications are made possible on an installed (embedded) PC as well as on external field computers. In addition to a keypad 11, the DEG also comprises the arrangement of a contact-sensitive screen mask 12 (touchscreen) which can advantageously be used in connection with the image display module BAM.

Figure 3:
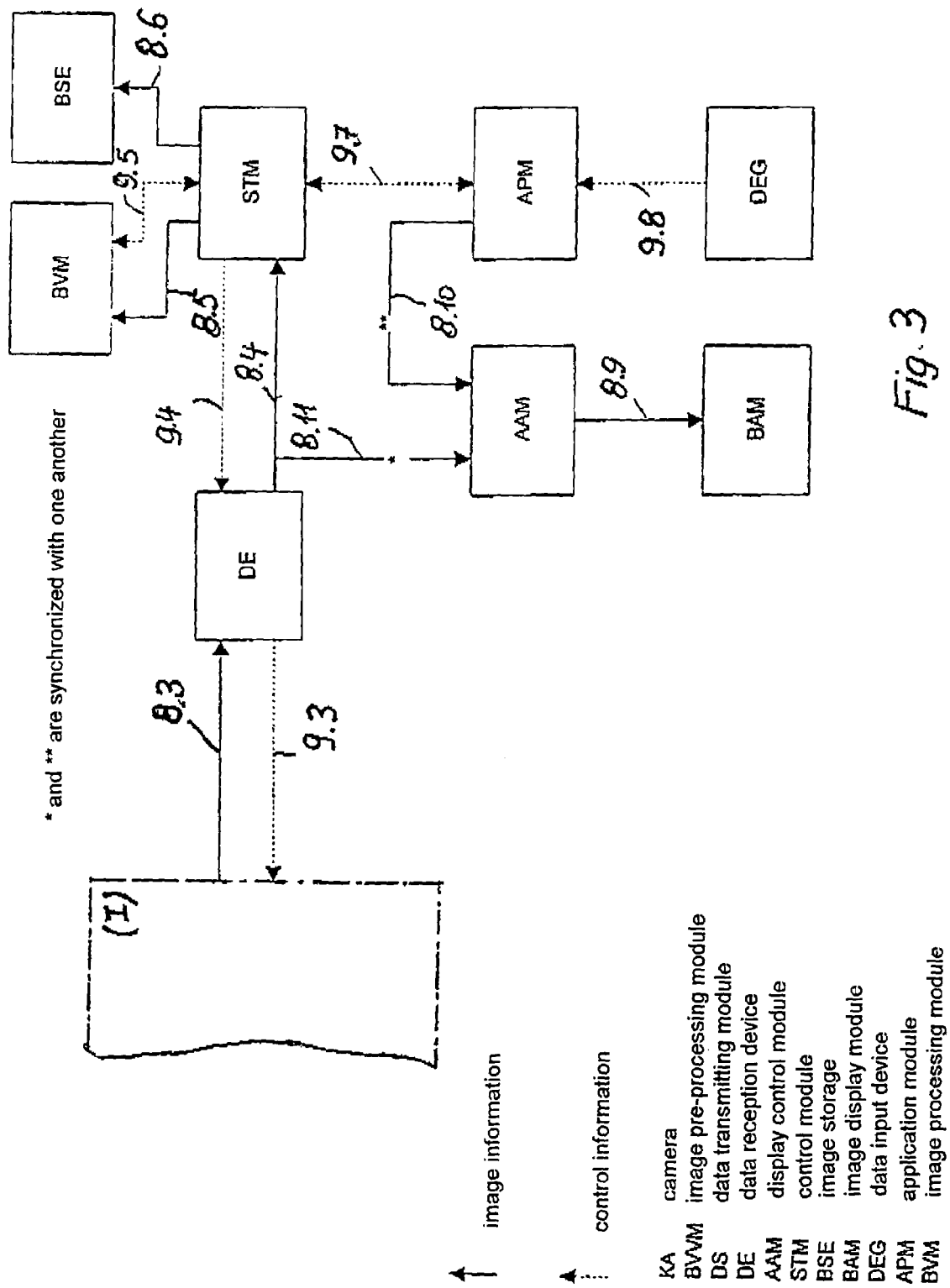
FIG. 3 shows another construction of the invention.

In the additional embodiment form of the system according to the invention which is shown in FIG. 3, the control module STM, application module APM, display control module AAM and image processing module BVM are accordingly connected via a common bus in which the control lines 9.5 and 9.7 and data lines 8.4; 8.5; 8.10 and 8.11 are joined. Image data from the camera module KA, not shown in FIG. 3, which is arranged in function group (I) are transmitted to the display control module AAM via the data reception device DE and data line 8.11 and data to be blended in with the latter are transmitted synchronously from the application module APM via data line 8.10 to the display control module AAM.

An overlay display is made possible by means of a simple logical element which is carried out by the display control module AAM, i.e., additional information such as measured values are blended into the image data. This is carried out in that the image content originating from the camera KA is cut out at the locations of the image that are occupied with information by the APM. No intermediate storage of complete image contents or complicated calculation of image data are necessary for this purpose. The image to be displayed for all received image point information is put together by means of this logical element from the image data received from the camera module KA and originating from the application module APM and this image point information is transmitted to the image display module (BAM) immediately after this operation.

The image processing module BVM receives the image data from the camera KA via control module STM in the same time clock and, whenever an image processing operation is to be applied to a new image, takes over an image in its internal image storage which is needed for calculation, i.e., the image processing module BVM and the control module STM constitute a slave in the data flow and information flow with respect to the image data, since image data are not actively demanded. The concept is accordingly tailored to an isochronous transmission and display of image data.

While the foregoing description and drawings represent the present invention, it will be obvious to those skilled in the art that various changes may be made therein without departing from the true spirit and scope of the present invention.

What is claimed is:

1. A method for carrying out an information flow and/or data flow in a geodetic instrument with image processing, comprising the steps of:

distributing the data flow and information flow needed for image processing to a plurality of function modules which are arranged in the instrument and which comprise function groups and are carried out by these function groups; and implementing at least two different operating modes in the instrument, a first operating mode being used for orientation of the instrument to a target and a second operating mode being used for measurements in the received image, wherein the function groups include a first function group comprising a camera module, an image pre-processing module, and a data transmitting device, a second function group connected to the first function group comprising a data reception device, control module, image processing module and an image storage device, and a third function group coupled to the second function group comprising a display control module, an image display module, an application module and a data input device, wherein the first function group records image data, the second function group processes the image data and the third function group displays the image data.

2. The method according to claim 1, wherein image data are to be transmitted synchronously from the camera module and from the application module to the display control module and additional information is blended into the image display in the display control module.

3. An arrangement for carrying out an information flow and/or data flow for geodetic instruments with image processing, comprising:

a plurality of function groups being arranged in the instrument at locations determined by its construction design, said function groups being composed of a plurality of function modules, wherein the function groups include a first function group comprising a camera module, an image pre-processing module, and a data transmitting device, a second function group connected to the first function group comprising a data reception device, control module, image processing module and an image storage device, and a third function group coupled to the second function group comprising a display control module, an image display module, an application module and a data input device; and means for switching between at least two different operating modes, a first operating mode being used for orientation of the instrument to a target and a second operating mode being used for measurements in the received image, wherein the first function group records image data, the second function group processes the image data and the third function group displays the image data wherein a first function group includes a camera module displaced within a telescope body.

4. The arrangement according to claim 3, wherein the function modules are realized in the instrument, at least in part, as hardware in the form of correspondingly constructed subassemblies.

5. The arrangement according to claim 3, wherein the function modules are implemented, at least in part, in software for the instrument, wherein the function modules implemented in software are associated with at least one hardware device.

6. The arrangement according to claim 1, wherein the first function group is arranged in the telescope body of the geodetic instrument.

7. The arrangement according to claim 3, wherein the second function group is arranged in the support of the geodetic instrument.

* * * * *